United States Patent
Ben Zvi et al.

(10) Patent No.: US 12,260,228 B1
(45) Date of Patent: Mar. 25, 2025

(54) OPTIMIZING CONFIGURATION RULES OVER MULTIPLE MANAGEMENT DOMAINS

(71) Applicant: Axonius Solutions Ltd., Tel-Aviv (IL)

(72) Inventors: Gil Ben Zvi, Hod HaSharon (IL); Roee Salomon, Herzeliya (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

(21) Appl. No.: 18/915,484

(22) Filed: Oct. 15, 2024

(51) Int. Cl.
*G06F 9/44* (2018.01)
*G06F 9/445* (2018.01)

(52) U.S. Cl.
CPC ................. *G06F 9/44505* (2013.01)

(58) Field of Classification Search
CPC ................. G06F 1/32; G06F 1/12; G06F 9/44
See application file for complete search history.

(56) References Cited

U.S. PATENT DOCUMENTS

| | | | | |
|---|---|---|---|---|
| 2004/0162977 A1* | 8/2004 | King | ................ | G06F 11/2094 714/E11.019 |
| 2022/0229994 A1* | 7/2022 | Sharma | ................ | H04L 51/02 |

* cited by examiner

*Primary Examiner* — Keshab R Pandey

(57) ABSTRACT

Optimizing configuration rules in a computerized system comprises accessing a set of configuration rules associated with one or more management domains, computing standardized configuration rules, and iteratively optimizing these rules. The optimization process involves computing a candidate set of optimized rules, comparing the candidate set of optimized rules to the original set using a distance metric, and accepting the optimized set if it meets a proximity threshold. System configuration values are then modified based on the optimized rules. The method enhances efficiency and security in identity management systems by reducing redundancies, updating outdated rules, and simplifying rule expressions.

10 Claims, 5 Drawing Sheets

OPTIMIZING CONFIGURATION RULES OVER MULTIPLE MANAGEMENT DOMAINS

FIELD AND BACKGROUND OF THE INVENTION

Some embodiments described in the present disclosure relate to an asset management system and, more specifically, but not exclusively, to an identity management system.

As used herein, the term "user" refers to an actor within a computerized system of an organization, for example an enterprise organization. A user may be a human user, for example an employee of the organization. Some other examples of a user include a contractor and a customer. A user may be a computerized agent, for example a software program, for example a management application.

In the field of Information Technologies (IT), the term "asset management" refers to the systematic process of tracking, managing, maintaining, and optimizing an organization's IT assets throughout their lifecycle. This includes both physical assets like hardware (some examples include servers, laptops, mobile devices, storage devices and network devices) and digital assets such as software applications, software services, licenses, and data, for example digital data identifying and describing a user. Within the realm of asset management, the term "identity management" refers to ensuring that the right users have the correct permissions to access specific IT assets based on their roles within the organization. For example, when an employee of an organization is issued a laptop or granted access to a cloud application, identity management controls authentication, i.e. verifying the employee's identity, and authorization, determining what the user can do with the asset (i.e. the laptop or cloud application). In another example, when an employee changes roles or leaves the organization, identity management ensures that access to some assets is updated or revoked in a timely manner.

Identity management systems are crucial components of modern computerized systems, managing entitlements of entities such as users, physical devices, or applications. These systems control access permissions to applications and resources, as well as role assignments within an organization. As used herein, the term management domain refers to a distinct area of IT asset management, typically associated with a specific tool, system, or set of processes that handles a particular aspect of asset information and control. A management domain has an identified scope of assets it manages or monitors. The scope of assets a management domain manages may be based on, for example, asset type (e.g., hardware, software, user accounts), organizational division (e.g., department, geographical location), or functional area (e.g., security, inventory, performance). The scope may be based on a combination of criteria. In today's complex IT environments, organizations often operate multiple management domains, each with its own set of rules, formats, and management tools. Some examples of a management domain are Microsoft Active Directory, AWS, VmWare ESXi, and McAfee ePO.

SUMMARY OF THE INVENTION

It is an object of some embodiments described in the present disclosure to provide a system and a method for optimizing configuration rules in a computerized system with multiple management domains, particularly in the context of Identity Management Systems. The invention addresses the challenges of rule proliferation, inter-domain redundancy, outdated rules, and reduced human-readability by introducing an automated, iterative optimization process that operates across all management domains.

The foregoing and other objects are achieved by the features of the independent claims. Further implementation forms are apparent from the dependent claims, the description and the figures.

According to a first aspect, a method for configuring a computerized system comprises: accessing at least one set of configuration rules, each rule associated with at least one of one or more management domains of the computerized system; computing a set of standardized configuration rules by computing for each configuration rule of the at least one set of configuration rules a standardized rule according to an identified rule format; computing a set of optimized configuration rules by in each optimization iteration of at least one optimization iteration: computing a candidate set of optimized configuration rules by applying an optimization method to the set of standardized configuration rules; and setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and modifying, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system.

According to a second aspect, a system for optimizing configuration rules in a computerized system, comprising at least one hardware processor configured to: access at least one set of configuration rules, each rule associated with at least one of one or more management domains of the computerized system; compute a set of standardized configuration rules by computing for each configuration rule of the at least one set of configuration rules a standardized rule according to an identified rule format; compute a set of optimized configuration rules by in each optimization iteration of at least one optimization iteration: computing a candidate set of optimized configuration rules by applying an optimization method to the set of standardized configuration rules; and setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and modify, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system.

According to a third aspect, a software program product for managing a plurality of assets of a computerized system comprises: a non-transitory computer readable storage medium; first program instructions for accessing at least one set of configuration rules, each rule associated with at least one of one or more management domains of a computerized system; second program instructions for computing a set of standardized configuration rules by computing for each configuration rule a standardized rule according to an identified rule format; third program instructions for computing a set of optimized configuration rules by in each optimization iteration of at least one optimization iteration: computing a candidate set of optimized configuration rules by applying an optimization method to the set of standardized configuration rules; and setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and fourth program instructions for modifying, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system; wherein the first, second, third and fourth program instructions are executed by at least one computerized processor from the non-transitory computer readable storage medium.

With reference to the first and second aspects, in a first possible implementation of the first and second aspects computing the set of standardized configuration rules comprises: clustering the at least one set of configuration rules into one or more clusters based on at least one rule characteristic; for each cluster of the one or more clusters, applying a corresponding standardization method to convert a plurality of configuration rules in the cluster to the identified rule format, where the corresponding standardization method is based on the at least one rule characteristic. Optionally, the at least one rule characteristic includes at least one of: a source of a rule, a type of entity, a type of attribute, a degree of complexity of a rule, and an entity entitlement.

With reference to the first and second aspects, in a first possible implementation of the first and second aspects the method further comprises: converting at least one optimized rule of the set of optimized configuration rules to at least one domain specific format, each domain specific format corresponding to one of the one or more management domains. Optionally, the at least one configuration software object is at least part of a domain management tool of a management domain of the one or more management domains. Optionally, modifying the at least one system configuration value comprises executing the at least one configuration instruction by the domain management tool in the management domain.

With reference to the first and second aspects, in a first possible implementation of the first and second aspects the optimization method comprises at least one of: declining to include in the candidate set of optimized configuration rules at least one first rule of the set of standardized configuration rules when the at least one first rule is a duplication of a second rule of the set of standardized configuration rules, declining to include in the candidate set of optimized configuration rules the at least one first rule when the at least one first rule is logically identical to the second rule, declining to include in the candidate set of optimized configuration rules the at least one first rule when the at least one first rule is subsumed by the second rule, removing at least one rule expression from the at least one first rule, applying at least one logical operator to a plurality of rule expressions of the at least one first rule, and declining to include in the candidate set of optimized configuration rules the at least one first rule based on at least one statistical metric associated with the at least one first rule. Optionally, the optimization method is applied to at least one rule expression in a rule, the at least one rule expression reflects: a role associated with at least one entity of the plurality of entities of the computerized system, a subset of entries of the plurality of entities, and a permission associated with the at least one entity. Optionally, computing the distance value comprises: computing at least one similarity measure between the candidate set of optimized configuration rules and the set of standardized configuration rules, wherein the at least one similarity measure is selected from the group consisting of: a structural similarity measure of at least one rule expression, a semantic similarity measure between at least two configuration rules, a coverage similarity measure of at least one entity set affected by at least one configuration rule, an entitlement similarity measure of at least one entitlement associated with at least one configuration rule, and a readability measure of at least one rule expression; and computing the distance value using the at least one similarity measure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
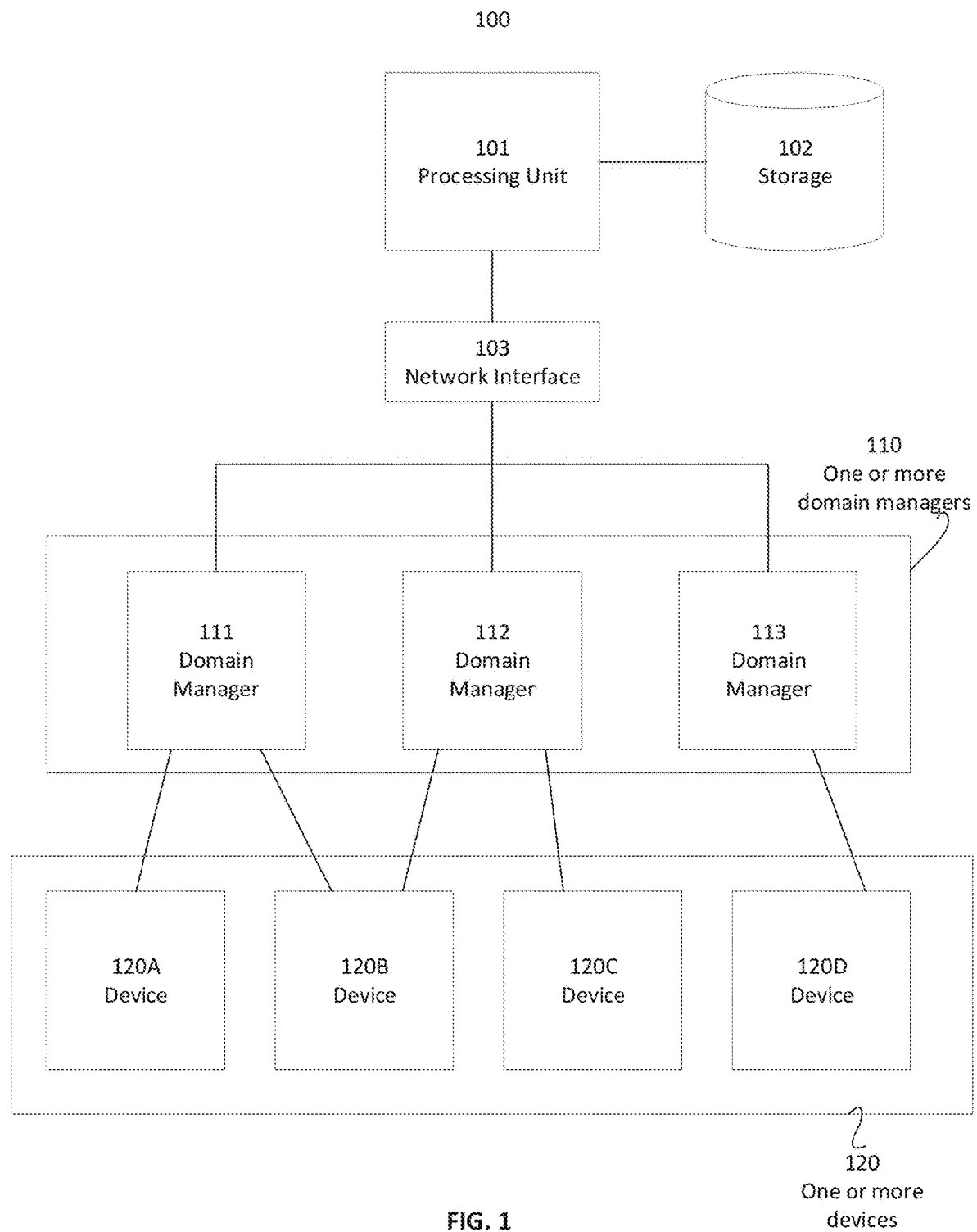
FIG. 1 is a schematic block diagram of an exemplary system, according to some embodiments.

A configuration rule is a formal statement or logical expression that defines conditions under which specific entitlements, permissions, or system configurations should be applied to entities within a computerized system, for example by an identity management system. A configuration rule typically consists of one or more conditions (an "if" part) and one or more actions or outcomes (a "then" part). A condition is typically based on entity attributes of an entity of the computerized system and an action typically involves granting one or more entitlements to the entity or setting configuration parameters of the computerized system.

While the following description focuses on aspects related to identity management of IT assets, it should be noted that the methods and systems described in this disclosure have broader applicability. The core concepts and techniques of rule optimization can be applied to any system that uses rules to govern the management of assets, whether those assets are digital or physical. Some examples of additional fields in which systems and methods described in the instant disclosure could be applied include the field of supply chain management, for example for rules that govern inventory levels, reorder points, and supplier selection across multiple warehouses or distribution centers, the field of manufacturing systems, for example for rules that control production schedules, quality control processes, and resource allocation across different production lines or facilities, the field of financial systems, for example for rules that manage risk assessment, credit approval, and fraud detection across various financial products or geographical regions, in the field of healthcare systems, for example for rules for patient care management, resource allocation, and regulatory compliance across different departments or healthcare facilities, and in the field of physical security systems, for example for access control rules for physical locations, integrating rules from different security domains (e.g., building access, restricted areas, time-based restrictions).

For brevity, unless otherwise noted henceforth the term "rule" is used to mean "configuration rule", and the terms are used interchangeably. In addition, as used herein the term "IT professional" refers to an individual who possesses the skill to work with computer systems, software, networks, and other technology-related infrastructure.

As organizations grow and evolve, their identity management systems face several challenges, in particular with regards to configuration rules that are used by the identity management system to manage an organization's computerized system. For example, the number of rules tends to increase over time, similar or duplicate rules may be created and some rules may become obsolete, referencing deprecated entity attributes or entitlements that are no longer relevant. In addition, as a rule set grows more complex, it may become increasingly difficult for an IT professional to understand and manage the rule set effectively. These challenges may lead to inefficiencies in system management. In addition, these challenges may pose significant security risks. Outdated or redundant rules may grant excessive permissions to unauthorized entities, potentially compromising the integrity of the computerized system.

As used herein, the term "domain manager" refers to a tool or a set of tools for managing a plurality of assets of the computerized system in a management domain. For brevity, henceforth the term "domain" is used to mean "management domain" and the terms are used interchangeably.

The challenges described above are exacerbated by the presence of multiple management domains in the computerized system. In addition, the presence of multiple management domains introduce additional challenges. Redundancy in the rule set, with similar or duplicate rules, is often due to lack of visibility and coordination between multiple domain managers, each operating within their own silo. For example, some rules in one domain may become redundant when other rules with broader scope are introduced in another domain. Without a holistic view of all domains, these redundancies are difficult to identify and resolve. In addition, in a multi-domain environment, identifying and updating outdated rules becomes more challenging, as changes in one management domain may not be immediately reflected in other domains. Another challenge arises when each management domain uses its own rule format and syntax. This inconsistency makes it extremely difficult to compare and optimize rules holistically across the entire system. In addition, considering cross-domain interactions between rules is more difficult when rule syntax is inconsistent across the system. In particular, the lack of a unified view across multiple domains can create security blind spots where vulnerabilities may go unnoticed.

Some automated solutions exist for optimizing rules, but they typically operate within the confines of a single management domain. These domain-specific tools fail to address the cross-domain challenges and may even exacerbate the problem by optimizing rules within one domain without considering their impact on or interaction with rules in other domains.

There is a need for a solution that can address the challenges described above by optimizing the set of configuration rules of the computerized system across all management domains while preserving the intended logic of the set of configuration rules and maintaining human-readability of the set of configuration rules. Such a solution would significantly improve the efficiency and security of an identity management system, reducing the burden on IT professionals and minimizing the risk of security breaches due to mismanaged entitlements across domains.

As used herein, the term "rule expression" refers to a formalized representation of a configuration rule within an identity management system. More specifically, a rule expression is typically composed of one or more logical statements or conditions that, when evaluated, determine whether the rule applies to a given entity or situation within the computerized system. A rule expression may include, but is not limited to, one or more of: an attribute, i.e. a characteristic or property of an entity (e.g., user role, department, and location), an operator, for example a logical or comparative function, and an attribute value, i.e. a specific data point or range that an attribute is compared against. When a rule expression is applied, it is evaluated against a plurality of attributes and a plurality of attribute values of one or more entities to determine whether one or more entity entitlements associated with the rule expression should be granted or implemented. An important aspect of rule expressions in this context is their human-readability, as they often need to be understood and potentially modified by IT professionals.

An entity entitlement, in the context of this disclosure, refers to a specific right, privilege, or access permission granted to an entity within the computerized system. Some examples of an entity include a user, a device, an application, or any other object that can be assigned permissions within the system. Some examples of an entitlement include, but are not limited to, an access rights to a specific resource or data, a permissions to perform an identified operation or function, a role assignment within the computerized system and an authorization level for various system components of the computerized system. Entity entitlements are typically determined by applying configuration rules to the attributes of the entity. For example, a rule might state that all users in the "Finance" department are entitled to access financial reporting software. In such a rule the rule expression determines whether a user is in the "Finance" department, and the associated entitlements include a permission to access the financial reporting software.

The present disclosure, in some embodiments described herein, proposes optimizing a set of configuration rules of a computerized system with multiple management domains, by converting one or more sets of rules from different domains into a standardized format, and applying one or more optimization methods to the standardized rules from all domains, generating a candidate set of optimized rules. Optionally, this process is repeated iteratively, with each iteration potentially improving upon the previous one, considering rules from all domains simultaneously. To ensure that the optimized rules maintain the essential logic of the original rules across all domains, the system optionally compares the candidate set of configuration rules to the original set using a distance metric. Optionally, the distance metric considers domain-specific importance and cross-domain interactions. Optionally, the distance metric considers human-readability of rules. Combining one or more sets of configuration rules, each associated with one or more of a plurality of management domains into one set of standardized configuration rules having a common identified rule format facilitates addressing optimizing rules across more than one domain. For example, optimizing such a set of standardized configuration rules allows removing duplicate or logically identical rules across domains, consolidating similar rules from different domains, modifying or removing rules that are subsumed by other rules, even when the subsuming rule is in a different domain, reducing rule expressions by removing uninformative literals while considering attributes across all domains, simplifying rule expressions using logical operators, potentially combining rules from multiple domains, and filtering rules based on statistical metrics that take into account cross-domain relevance.

Converting the one or more sets of rules from the one or more domains into a standardized format facilitates optimizing rules across all management domains simultaneously, providing a truly comprehensive solution. By considering rules from all domains simultaneously, the system can identify and eliminate redundancies that would be impossible to detect with domain-specific approaches. In addition, optimizing rules across all domains enables ensuring that policies, for example access policies are enforced consistently throughout the organization.

Optionally, one or more entity entitlements are computed by applying one or more of the set of optimized configuration rules to digital data that comprises a plurality of entity attributes of an entity of the plurality of entities of the computerized system. Optionally, one or more configuration instructions are generated using the one or more entity entitlements. Optionally, one or more software configuration objects modify one or more system configuration values of the computerized system according to the one or more configuration instruction. Some examples of a system configuration value include, but are not limited to: a user account settings, for example a password expiration period or an account lockout thresholds, an access control settings, for example a role based access control definition, an access control list (ACL) for a resource, a Multi-factor authentication (MFA) requirement, a network security settings, for example a firewall rule, a Virtual Private Network (VPN) configuration parameter, or a network segmentation policy, a logging setting, an auditing setting, an application specific setting, a data retention policy, an authentication setting, a session management setting, and a resource allocation.

Optionally, the one or more software configuration objects are at least part of a domain management tool or at least one domain of the one or more domains of the computerized system.

Using the set of optimized configuration rules to generate the one or more configuration instructions used to modify the one or more system configuration values, where the set of optimized configuration rules were computed as described above, increases accuracy of configuration of the system compared to generating the one or more configuration instructions using the one or more sets of rules optimized independently, without cross-domain considerations.

Optionally, computing the set of standardized configuration rules comprises clustering the one or more sets of configuration rules associated with the one or more management domains into one or more clusters, based on one or more rule characteristics. It should be noted that in the context of this application, the term "clustering" refers to the general process of grouping a set of objects in such a way that objects in the same group (called a cluster) are more similar to each other than to those in other groups (clusters). This use of the term "clustering" is distinct from and should not be confused with specific unsupervised learning techniques in machine learning that also use the term "clustering." The clustering process described in this application involves grouping configuration rules based on rule characteristics or similarities. Some examples of a rule characteristic include, but are not limited to, the source of a rule, the rule's format or structure, the type of attributes or entitlements the rule deals with, and the management domain to which the rule belongs. A source of a rule may be a management domain. A rule may be created manually, by an IT professional. This clustering process is deterministic and based on known criteria, rather than being a method for discovering unknown patterns in data as is often the case in machine learning applications of clustering. Such clustering allows for more efficient processing of rules from multiple sources or formats by grouping similar rules together, enabling the application of appropriate standardization methods to each cluster.

Optionally, one or more of the set of optimized configuration rules is converted to one or more domain specific formats. Converting a rule of the set of optimized configuration rules to a domain specific format allows applying the rule in the domain, for example allowing a domain manager of the domain to generate the one or more configuration rules from the converted rule.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, system 100 comprises one or more management domains, managed by one or more domain managers 110. In this example, one or more domain managers 110 comprises domain manager 111 managing a first domain of the one or more management domains, domain manager 112 managing a second domain of the one or more management domains, and domain manager 113 managing a third domain of the one or more management domains. Optionally, processing unit 101 is connected to the one or more domain managers 110, optionally via one or more digital communication network interface 103. A processing unit may be any kind of programmable or non-programmable circuitry that is configured to carry out the operations described herein. The processing unit may comprise hardware as well as software. For example, the processing unit may comprise one or more hardware processors and a transitory or non-transitory memory that carries a program which causes the processing unit to perform the respective operations when the program is executed by the one or more hardware processors. Optionally, processing unit 101 executes at least one of one or more domain managers 110.

For brevity, henceforth the term "network interface" is used to mean "one or more digital communication network interface" and the terms are used interchangeably. Optionally, network interface 103 is connected to a local area network (LAN), for example an Ethernet network or a Wi-Fi network. Optionally, network interface 103 is connected to a wide area network (WAN), for example a cellular network or the Internet.

Optionally, processing unit 101 is connected to one or more non-volatile digital storage 102, optionally for storing one or more set of configuration rules. For brevity, henceforth the term "storage" is used to mean "one or more non-volatile digital storage" and the terms are used interchangeably. Some examples of a digital storage include a hard disk drive, a solid state drive (SSD), a network connected storage and a storage network. Optionally storage 102 is electrically connected to processing unit 101, for example when storage 102 is a hard disk drive or a solid state drive. Optionally, storage 102 is connected to processing unit 101 via network interface 103, for example when storage 102 is a storage network or a network attached storage.

Optionally, system 100 comprises one or more devices, for example comprising device 120A, device 120B, device 120C and device 120D, referred to collectively as one or more devices 120. Optionally, each of one or more devices 120 is connected to at least one of the one or more domain managers 110. In this example, device 120B is connected to both domain manager 111 and domain manager 112, and domain manager 112 is connected to both device 120B and device 120C. Some examples of a device include, but are not limited to, a computer, a server, a laptop computer, a mobile device, a storage device and a network device, for example a router.

Optionally, at least one of one or more domain managers 110 manages a plurality of software entities of system 100, for example one or more users of system 100. Other examples include one or more software applications executed by at least one of one or more devices 120 or by processing unit 101.

To configure computerized system 100, in some embodiments system 100 implements the following optional method.

Figure 2:
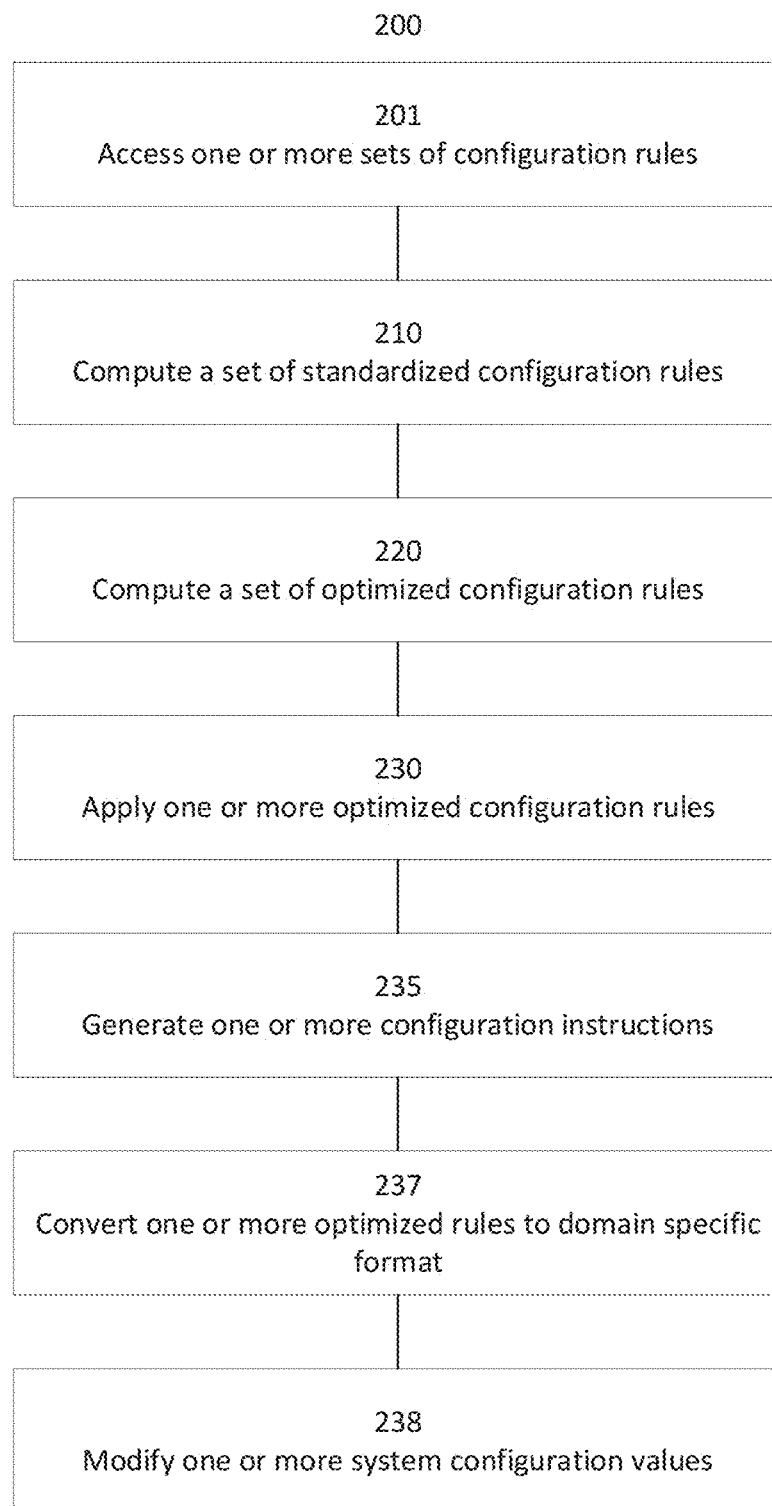
FIG. 2 is a flowchart schematically representing an optional flow of operations for configuring a computerized system, according to some embodiments.

Reference is now made also to FIG. 2, showing a flowchart schematically representing an optional flow of operations 200 for configuring a computerized system, according to some embodiments. In such embodiments, in 201 processing unit 101 accesses one or more sets of configuration rules. Optionally, each rule of the one or more sets of configuration rules is associated one at least one of the one or more management domains of system 100. Optionally, processing unit 101 receives at least some of the one or more sets of configuration rules from at least one of one or more domain managers 110, optionally via network interface 103. Optionally, processing unit 101 retrieves at least some other of the one or more sets of configuration rules from storage 102. Optionally, at least one of the at least some other rules is stored on storage 102 by at least one of one or more domain managers 110. Optionally, at least one other of the at least some other rules is stored on storage 102 by at least one IT professional.

Figure 3:
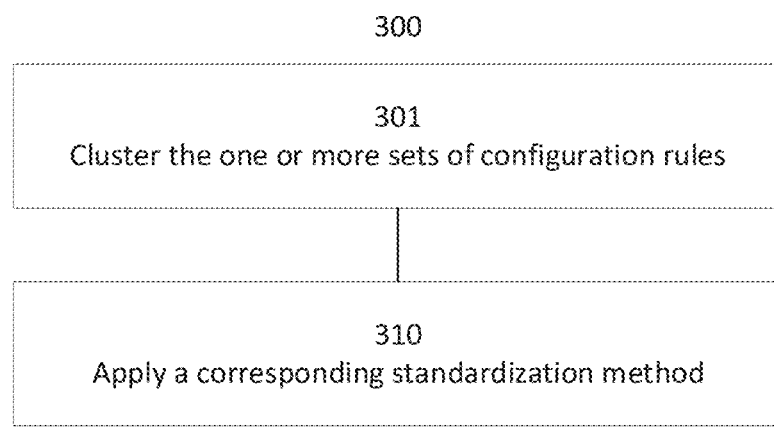
FIG. 3 is a flowchart schematically representing an optional flow of operations for computing a set of standardized configuration rules, according to some embodiments.
Figure 4:
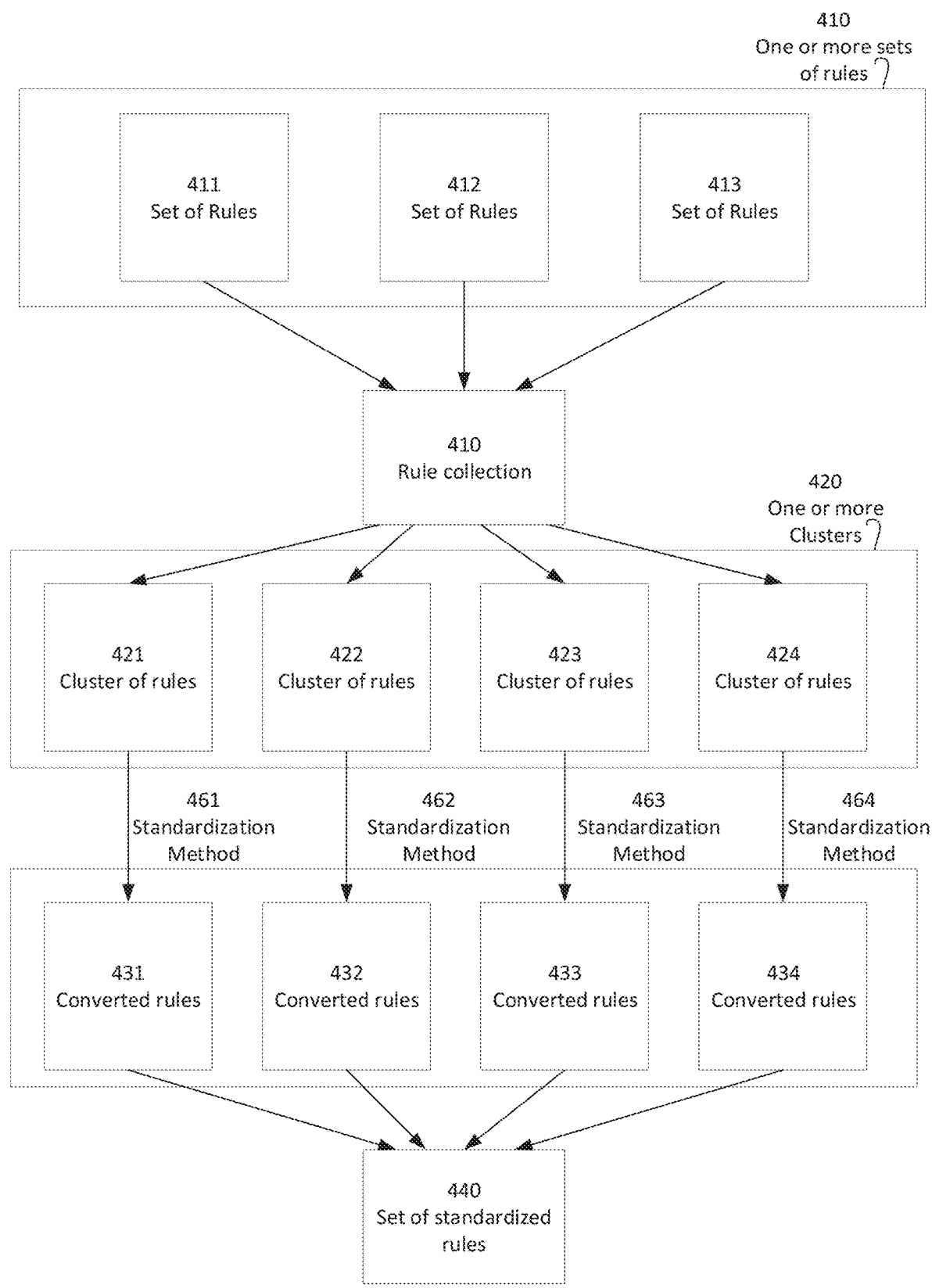
FIG. 4 is a schematic block diagram of an exemplary plurality of clusters of rules, according to some embodiments.

In 210, processing unit 101 optionally computes a set of standardized rules. Optionally, processing unit 101 computes the set of standardized rules by configuring a standardized rule for each of the one or more sets of configuration rules. Optionally, processing unit 101 computes the standardized rule according to an identified rule format. Reference is now made also to FIG. 3, showing, a flowchart schematically representing an optional flow of operations 300 for computing a set of standardized configuration rules, according to some embodiments. Reference is now also made to FIG. 4, showing a schematic block diagram of an exemplary plurality of clusters of rules 400, according to some embodiments.

In such embodiments, in 201 processing unit 101 accesses one or more sets of rules 410, comprising for example set of rules 411, set of rules 412 and set of rules 413. In this example, set of rules 411 may be associated with a management domain managed by domain manager 111. Optionally, processing unit 101 collects the one or more sets of rules 410 to rule collection 410.

Optionally, to compute the set of standardized rule, in 301 processing unit clusters the one or more set of rules 410 into one or more clusters 420, for example comprising cluster of rules 421, cluster of rules 422, cluster of rules 423 and cluster of rules 424. Optionally, the rule collection 410 is distributed among the one or more clusters 420. Optionally, processing unit 101 clusters the rule collection 410 into one or more clusters 420 based on one or more rule characteristics. Some examples of a rule characteristic include, but are not limited to: a source of a rule, a type of entity, a type of attribute, a degree of complexity of a rule, and an entity entitlement. An example of a source of a rule is a domain manager, for example Okta or Azure. Another example of a source of a rule is a manually create rule. A degree of complexity of a rule refers to complexity of the rule's expression, for example whether the rule expression comprises a simple condition or a complex Boolean expression.

Reference is now made again to FIG. 3. In 310, processing unit 101 optionally applies for each cluster of the one or more clusters of rule 420 a corresponding standardization method to convert a plurality of rules in the cluster to the identified rule format. Reference is now made again to FIG. 4. In 310, processing unit optionally applies for cluster of rules 421 a first standardization method 461 to a first plurality of rules in cluster of rules 421, to produce plurality of converted rules 431 in the identified rule format. Optionally, first standardization method 461 is based on the one or more rule characteristics upon which cluster of rules 421 is based. For example, when cluster of rules 421 is based on a combination of a role of an employee and geographical location of the employee, first standardization method 461 is based on the combination of the role of an employee and the geographical location of the employee. Similarly, in 310 processing unit optionally applies for cluster of rules 422 a second standardization method 462 to a second plurality of rules in cluster of rules 422, to produce plurality of converted rules 432 in the identified rule format. Optionally, second standardization method 462 is based on other one or more rule characteristics upon which cluster of rules 422 is based. Similarly, in 310 processing unit optionally applies for cluster of rules 423 a third standardization method 463 to a third plurality of rules in cluster of rules 423, to produce plurality of converted rules 433 in the identified rule format. Optionally, third standardization method 463 is based on yet other one or more rule characteristics upon which cluster of rules 423 is based. Similarly, in 310 processing unit optionally applies for cluster of rules 424 a fourth standardization method 464 to a fourth plurality of rules in cluster of rules 424, to produce plurality of converted rules 434 in the identified rule format. Optionally, third standardization method 464 is based on additional other one or more rule characteristics upon which cluster of rules 424 is based. Optionally, processing unit 101 combines plurality of converted rules 431, plurality of converted rules 432, plurality of converted rules 433 and plurality of converted rules 434 to generate set of standardized rules 440, all of set of standardized rules 440 in the identified rule format.

Reference is now made again to FIG. 2. In 220, processing unit 101 computes a set of optimized configuration rules. Optionally, to compute the set of optimized rules, processing unit 101 executes the following method.

Figure 5:
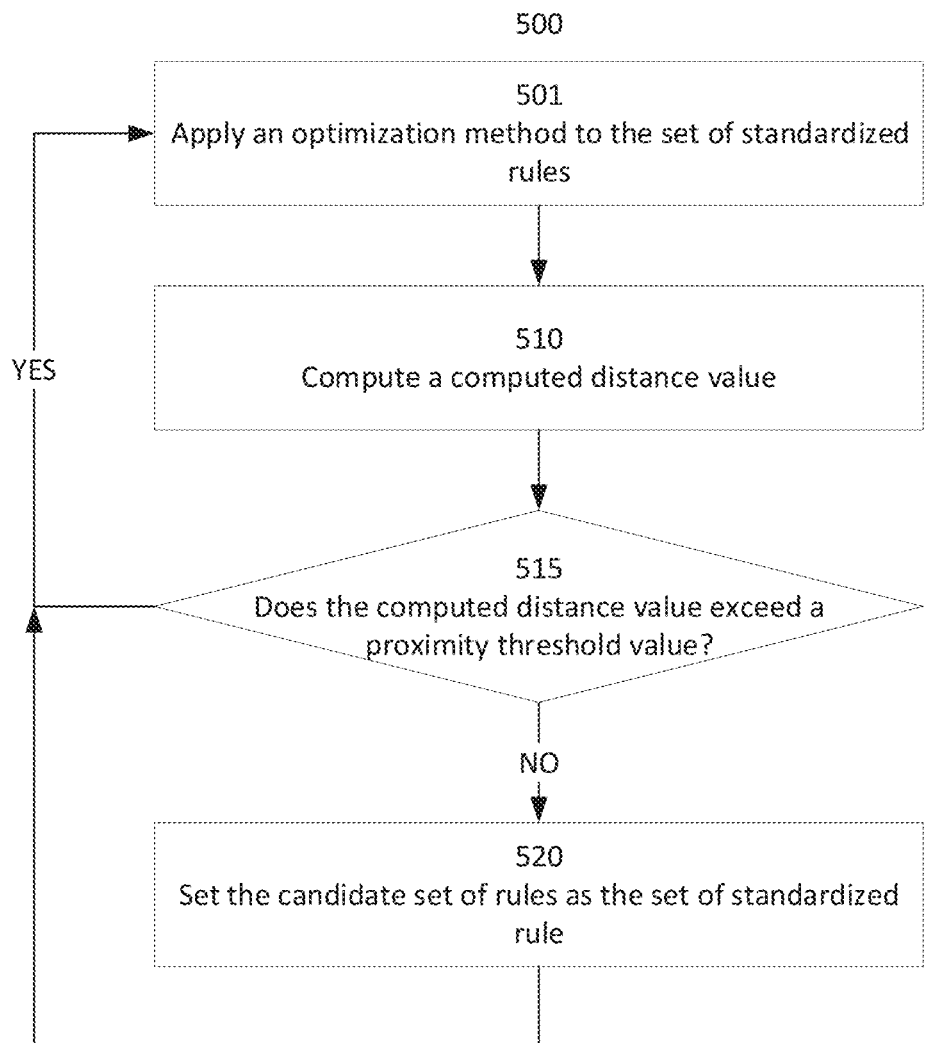
FIG. 5 is a flowchart schematically representing an optional flow of operations for optimizing a set of configuration rules, according to some embodiments.

Reference is now made also to FIG. 5, showing a flowchart schematically representing an optional flow of operations 500 for optimizing a set of configuration rules, according to some embodiments. In such embodiments, processing unit 101 executes one or more optimization iterations. Optionally, in each of the one or more optimization iterations, processing unit 101 applies in 501 an optimization method to the set of standardized rules 440, to produce a candidate set of rules. Optionally, the optimization method comprises declining to include in the candidate set of rules one or more first rules of set of standardized rules 440. For example, processing unit 101 may decline to include the one or more first rules in the candidate set of rules when the one or more first rules are redundant, for example when the one or more first rules is a duplication of a second rule of the set of standardized configuration rules 440, when the one or more first rule is logically identical to the second rule, or when the one or more first rule is subsumed by the second rule. Optionally, the optimization method comprises removing one or more rule expressions from the one or more first rules, for example when the one or more rule expressions do not affect an outcome of applying the rule. Optionally, the optimization method comprises applying one or more logical operators to a plurality of rule expressions of the one or more first rules, for example to reduce complexity of the plurality of rule expressions and additionally or alternatively to convert the plurality of rule expressions to the identified rule format. Optionally, the optimization method comprises declining to include the one or more first rules in the candidate set of optimized configuration rules based on one or more statistical metrics associated with the one or more first rules, for example a confidence score associated with the rule or a value reflecting an amount of existing configured entities that adhere to the rule. Optionally, the optimization method comprises modifying one or more statistical metrics associated with a rule.

Optionally, each of the set of standardized rules comprises one or more rule expressions that represent a plurality of attributes of one or more of plurality of entities of system 100. Optionally, each of the set of standardized rules comprises one or more other rule expressions that represent one or more entity entitlements. Optionally, the optimization method is applied to the plurality of attributes. Optionally, the optimization method is applied to the one or more entity attributes. Optionally, the optimization method is applied to a rule expression that reflect a role associated with one or more entities of the plurality of entities. Optionally, the optimization method is applied to a rule expression that reflects a subset of entries of the plurality of entries. Optionally, the optimization method is applied to a rule expression that reflects a permission associated with one or more of the plurality of entities of the computerized system.

Further in each of the one or more optimization iterations, in 510 processing unit 101 optionally computes a distance value, optionally computed using the candidate set of optimized configuration rules and the set of standardized rules 440. Optionally, computing the distance value comprises computing one or more similarity measures between the candidate set of optimized rules and the set of standardized rules 440, such that a similarity measure reflects a degree of similarity between the two sets of rules with regards to one or more similarity characteristics. Optionally, processing unit 101 computes the distance value using the one or more similarity measures.

Optionally, a similarity measure is a structural similarity measure of one or more rule expressions, reflecting an outcome of a comparison between syntactic structures or formats of rule expressions. A similarity measure may reflect the use of Boolean operators, the nesting of conditions, or the overall complexity of a rule's structure, or any combination thereof.

Optionally, a similarity measure is a semantic similarity measure between at least two configuration rules, reflecting whether the at least two rules, even if expressed differently, have the same or similar effects when applied.

Optionally, a similarity measure is a coverage similarity measure of at least one entity set affected by at least one configuration rule, reflecting whether the candidate set of optimized rules applies to the same or a similar group of entities as the set of standardized rules 440.

Optionally, a similarity measure is an entitlement similarity measure of at least one entitlement associated with at least one configuration rule, reflecting whether applying the candidate set of optimized rules results in the same or very similar entitlements as the set of standardized rules 440, maintaining the intended access control and security policies.

Optionally, a similarity measure is a readability measure of at least one rule expression, reflecting how easily an IT professional can understand and interpret a rule expression.

In 515, processing unit 101 compares the distance value to a proximity threshold. Subject to the distance value not exceeding the proximity threshold, in 520 processing unit 101 optionally sets the candidate set of optimized rules as the set of standardized rule 440 in a following optimization iteration of the plurality of optimization iterations. When the distance value exceeds the proximity value, processing unit 101 may decline to set the candidate set of optimized rules as the set of standardized rule 440 in the following optimization iteration.

Optionally, after executing the plurality of optimization iterations processing unit 101 uses the candidate set of optimized rules produced in a last iteration of the plurality of optimization iterations as the set of optimized configuration rules.

Reference is now made again to FIG. 2.

In 230, processing unit 101 optionally applies one or more of the set of optimized configuration rules to digital data that comprises a plurality of entity attributes of an entity of the plurality of entities of system 100, to compute one or more entity entitlements. In 235, processing unit 101 optionally generates one or more configuration instructions according to the one or more entity entitlement. Optionally, in 238 processing unit 101 modifies one or more system configuration values of system 100 according to the one or more configuration instructions. Optionally, processing unit 101 modifies the one or more system configuration values by one or more configuration software objects. Optionally, processing unit 101 provides the one or more configuration software objects with the one or more configuration instructions.

Optionally, the one or more configuration software objects are at least part of one of the one or more domain managers, for example domain manager 121. Optionally, the one or more configuration software objects generate the one or more configuration instructions, optionally in using one or more configuration rules received from processing unit 101. Optionally, processing unit 101 provides domain manager 121 with one or more optimized rules of the set of optimized configuration rules. Optionally, in 237 processing unit 101 converts the one or more optimized rules of the set of optimized configuration rules to one or more domain specific formats, corresponding to domain manager 121, to produce one or more converted rules. Optionally, processing unit 101 provides domain manager 121 with the one or more converted rules. Optionally, domain manager 121 applies the one or more converted rules in a management domain managed by domain manager 121, optionally by generating the one or more configuration instructions using the one or more converted rules.

As described above, the solution described in the present disclosure may be applied in fields other than identity management. In each of the contexts mentioned above, the present solution's ability to standardize, optimize, and de-standardize rules across multiple domains can provide significant benefits. As was described above, the present solution can identify redundancies, simplify complex rule sets, and ensure consistent policy enforcement across different aspects of an organization or system. The core components of the solution-rule collection, standardization, optimization, and coordinated implementation-remain applicable regardless of the specific type of assets being managed. The distance metrics and optimization methods may need to be adjusted to suit the particular context, but the fundamental approach of cross-domain rule optimization remains valid. This broader applicability makes the present solution a powerful tool for improving efficiency, consistency, and manageability in a wide range of complex systems that rely on rule-based governance of assets and resources.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant rule characteristics, distance metrics and optimization methods will be developed and the scope of the terms "rule characteristic", "distance metric" and "optimization method" is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for configuring a computerized system, comprising:
   accessing at least one set of configuration rules, each rule associated with at least one of one or more management domains of a computerized system;
   computing a set of standardized configuration rules by computing for each configuration rule of the at least one set of configuration rules a standardized rule according to an identified rule format;
   computing a set of optimized configuration rules by in each optimization iteration of at least one optimization iteration:
      computing a candidate set of optimized configuration rules by applying an optimization method to the set of standardized configuration rules; and
      setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and
   modifying, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system.

2. The method of claim 1, wherein computing the set of standardized configuration rules comprises:
   clustering the at least one set of configuration rules into one or more clusters based on at least one rule characteristic;
   for each cluster of the one or more clusters, applying a corresponding standardization method to convert a plurality of configuration rules in the cluster to the identified rule format, where the corresponding standardization method is based on the at least one rule characteristic.

3. The method of claim 2, wherein the at least one rule characteristic includes at least one of: a source of a rule, a type of entity, a type of attribute, a degree of complexity of a rule, and an entity entitlement.

4. The method of claim 1, further comprising:
   converting at least one optimized rule of the set of optimized configuration rules to at least one domain specific format, each domain specific format corresponding to one of the one or more management domains.

5. The method of claim 1, wherein the at least one configuration software object is at least part of a domain management tool of a management domain of the one or more management domains; and
   wherein modifying the at least one system configuration value comprises executing the at least one configuration instruction by the domain management tool in the management domain.

6. The method of claim 1, wherein the optimization method comprises at least one of:
   declining to include in the candidate set of optimized configuration rules at least one first rule of the set of standardized configuration rules when the at least one first rule is a duplication of a second rule of the set of standardized configuration rules,
   declining to include in the candidate set of optimized configuration rules the at least one first rule when the at least one first rule is logically identical to the second rule,
   declining to include in the candidate set of optimized configuration rules the at least one first rule when the at least one first rule is subsumed by the second rule,
   removing at least one rule expression from the at least one first rule,
   applying at least one logical operator to a plurality of rule expressions of the at least one first rule, and
   declining to include in the candidate set of optimized configuration rules the at least one first rule based on at least one statistical metric associated with the at least one first rule.

7. The method of claim 1, wherein the optimization method is applied to at least one rule expression in a rule, the at least one rule expression reflects: a role associated with at least one entity of the plurality of entities of the computerized system, a subset of entries of the plurality of entities, and a permission associated with the at least one entity.

8. The method of claim 1, wherein computing the distance value comprises:
   computing at least one similarity measure between the candidate set of optimized configuration rules and the set of standardized configuration rules, wherein the at least one similarity measure is selected from the group consisting of:
      a structural similarity measure of at least one rule expression,
      a semantic similarity measure between at least two configuration rules,
      a coverage similarity measure of at least one entity set affected by at least one configuration rule,
      an entitlement similarity measure of at least one entitlement associated with at least one configuration rule, and
      a readability measure of at least one rule expression; and
   computing the distance value using the at least one similarity measure.

9. A system for optimizing configuration rules in a computerized system, comprising at least one hardware processor configured to:

access at least one set of configuration rules, each rule associated with at least one of one or more management domains of the computerized system;

compute a set of standardized configuration rules by computing for each configuration rule of the at least one set of configuration rules a standardized rule according to an identified rule format;

compute a set of optimized configuration rules by in each optimization iteration of at least one optimization iteration:

computing a candidate set of optimized configuration rules by applying an optimization method to the set of standardized configuration rules; and setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and modify, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system.

10. A software program product for managing a plurality of assets of a computerized system, comprising:

a non-transitory computer readable storage medium;

first program instructions for accessing at least one set of configuration rules, each rule associated with at least one of one or more management domains of a computerized system;

second program instructions for computing a set of standardized configuration rules by computing for each configuration rule a standardized rule according to an identified rule format;

third program instructions for computing a set of optimized configuration rules by in each optimization iteration of at least one optimization iteration:

computing a candidate set of optimized configuration rules by applying an optimization method to the set of standardized configuration rules; and setting the candidate set of optimized configuration rules as the set of standardized configuration rules in a following optimization iteration of the at least one optimization iteration, where setting the candidate set of optimized configuration rules is done subject to an outcome of comparing a distance value, computed using the candidate set of optimized configuration rules and the set of standardized configuration rules, to a proximity threshold value; and fourth program instructions for modifying, by at least one configuration software object, at least one system configuration value of the computerized system according to at least one configuration instruction generated using at least one entity entitlement, where the at least one entity entitlement is computed by applying at least one of the set of optimized configuration rules to digital data comprising a plurality of entity attributes of an entity of a plurality of entities of the computerized system;

wherein the first, second, third and fourth program instructions are executed by at least one computerized processor from the non-transitory computer readable storage medium.

\* \* \* \* \*